3,199,069
ACOUSTICAL-TO-OPTICAL IMAGE CONVERTER
John B. Lord, Summit, N.J., and Victor Harris, Edmonds, Wash., assignors, by mesne assignments, to the United States of America as represented by the Secretary of the Navy
Filed May 7, 1962, Ser. No. 193,028
7 Claims. (Cl. 340—1)

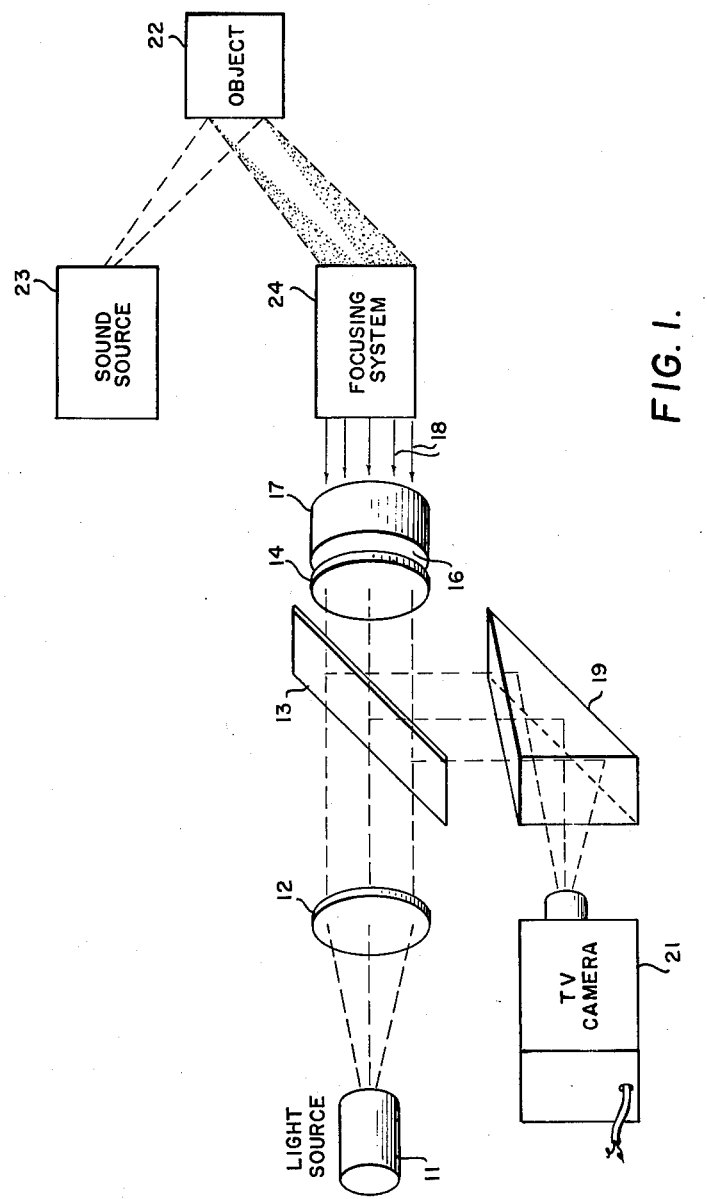
FIG. I.
INVENTORS
JOHN B. LORD
VICTOR HARRIS

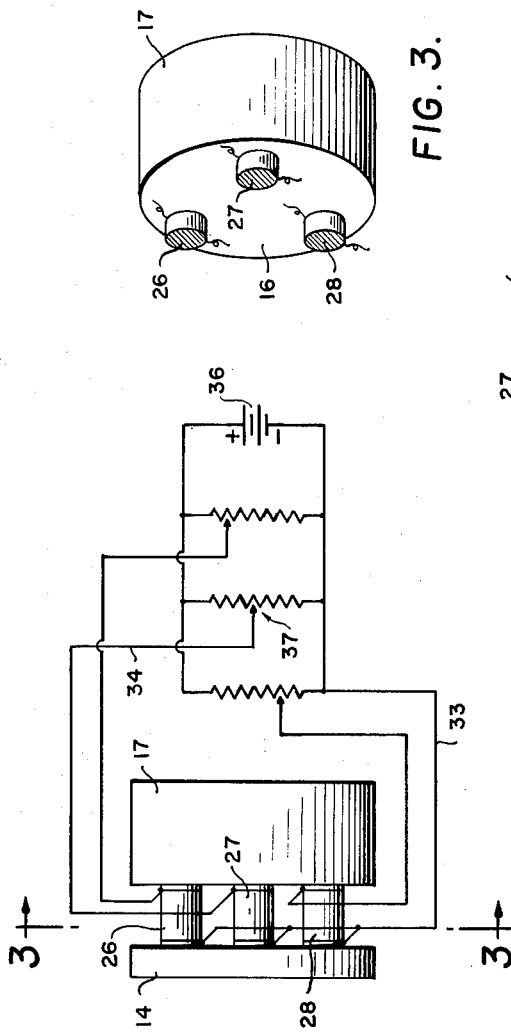
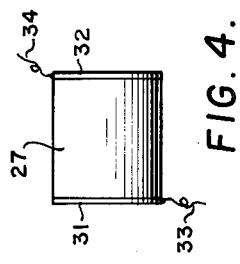

The present invention relates to the viewing of objects in opaque media and more particularly to a method and system wherein acoustic energy reflected by the object to be viewed is transformed directly into an optical image for viewing.

In many fields there has long existed a need for viewing objects in optically opaque materials. Application of such a system could include such diverse fields as the inspection of imperfections on a manufacturing production line to searching for objects in turbid water. Many other uses for such a system also have suggested themselves. A variety of systems have been used up to the present time for each of these applications but the need for an inexpensive system of this type still existed.

It has been known for many years that the behavior of sound waves is in many ways analogous to the behavior of visible light. For sufficiently high frequencies, sound may be propagated, refracted, reflected, focused, and in general controlled in a manner directly analogous to the methods used in obtaining optical images.

Accordingly, it has been suggested in the past that devices be built to obtain the images of high frequencies sound and convert these to optical images which can be viewed by the human observer. If the equipment for such purpose could be perfected it would be possible to look into many materials (metals, biological organisms, cloudy liquids) which are normally opaque in the normal optical sense.

Such equipment has awaited the development of a practical process or device for converting the acoustic image to an optical image. A variety of physical mechanisms have in the past been suggested to do this job. However, each of the proir systems has been relatively expensive as well as being not wholly satisfactory in other respects. The system of the present invention is a direct acoustical-to-optical image converter based on optical interference principles. In accordance with the present invention, monochromatic visible light passes through a collimating lens and a half-reflecting mirror which is set at substantially a 45 degree angle to the axis of the collimated beam. The beam of light is transmitted through an optical flat and reflected back from a second optical flat, the spacing between the two optical flats being such that the light reflected back from the second flat interferes destructively with incoming light from the first flat. By making the second flat as a polished surface of, for example, a disc of metallic material which is excited by an acoustic field, the perturbations of the reflecting surface of the second flat about the destructive interference position will cause light to be transmitted back through the first optical flat to the half-reflecting mirror from which it is reflected out of the system to, for example, a viewing screen, a television camera or the naked eye. Thus such local perturbations yield what is, in effect, a visual image of a sound field.

The system of the present invention allows the use of a low energy sound signal to modulate a high energy light beam, thus providing signal gain. The image viewing occurs simultaneously across the entire image area, which is in contradistinction to viewing by linear scan as is true of some prior art systems. By doing away with the necessity of a linear scan, all incoming acoustic energy may be utilized so that the efficiency of the system is greatly increased.

It is, therefore, an object of the present invention to provide a method and system for achieving direct conversion of an acoustical signal to an optical image.

A further object is the provision of a method and system for achieving direct conversion of an acoustical image to an optical image, which can also be used to transform low energy sound signals into high energy signals from which information transmitted by such low energy sound signals can be easily and practically derived.

Still another object is the provision of a device and method for the inspection or viewing of objects in optically opaque materials.

Other objects and many attendant advantages of this invention will be readily appreciated as the same becomes better understood by reference to the following detailed description when considered in connection with the accompanying drawings in which like reference numerals designate like parts throughout the figures thereof and wherein:

FIG. 1 is a schematic diagram of an acoustical-to-optical image converter made in accordance with the present invention;

FIG. 2 is a schematic view of a system for adjusting the spacing between the pair of optical flats utilized in the system of FIG. 1;

FIG. 3 is a cross-sectional view in perspective of the optical flat arrangement shown in FIG. 2 and taken on the line 3—3 of FIG. 2; and FIG. 4 is a side view in greater detail of one of the piezoelectric spacing devices utilized in the system of FIG. 2.

Referring now to the drawings, wherein like reference characters designate like or corresponding parts throughout the several views, there is shown in FIG. 1 a light source 11 which provides a beam of monochromatic, visible light, positioned so that its beam passes through a collimating lens 2. The collimated beam of light then passes through a half-reflecting mirror 13 which is set at substantially a 45 degree angle to the axis of the collimated light beam. All of the light impinging upon the half-reflecting mirror 13 passes through the mirror and through a first optical flat 14 but is reflected from a second optical flat 16 which is the rear surface of a member 17. The member 17 may be of any material capable of being optically finished, for example, glass or metallic or piezoelectric material. Impinging upon the opposite surface of the member 17 from the optical flat 16 is acoustical energy represented by the arrows 18 in the drawings.

The optical flat 14 may also be partially reflecting in that it passes light in the direction from the source 11 toward the optical flat 16 but reflects a portion of the light reflected back from the flat 16.

The spacing between the back face of the optical flat 14 and the reflecting optical flat 16 is controlled so that the light reflected from the flat crystal face 16 normally interferes destructively with the light transmitted through the flat 14. However, when the optical flat 16 of the member 17 is excited by the sound energy 18 the flat surface 16 will vibrate in accordance with the acoustic field 18 which is impinging on the member. When the member 17 is excited by the acoustic field, the perturbations of the reflecting flat surface 16 about the destructive interference position causes light to be reflected back through the optical flat 14 to the back face of half-reflecting mirror 13. The light impinging upon this back face of the half-reflecting mirror 13, however, will be reflected out of the system due to the reflecting surface on the mirror and its 45 degree angle. As shown in FIG. 1, a prism 19 may be used to reflect the light to a television camera 21. The camera 21 thus records the perturbations exerted on the optical flat 16 by the sound energy 18 which impinges thereon.

It is to be realized that the prism 19 and the television camera 21 are in no way essential to the functioning of the system and are merely shown as a convenient way to view the image by a transmission to a remote point. If there is no necessity for transmission of the image, it may be viewed by conventional optical means, such as a screen, thus eliminating the scanning mechanism inherent in conventional image converters such as the television camera, or it may be viewed directly by the naked eye of the observer.

The energy 18 impinging upon the member 17 may, for example, be representative of an object 22 which is acoustically illuminated, in effect, by a sound source 23. The signal from the sound source 23 is reflected from the object 22 to an acoustical focusing system 24 and thence to the crystal 17 in accordance with well known principles. It is also possible in some instances to form an image directly by acoustic shadow techniques wherein the acoustic source is located directly behind the object to be viewed. This is analogous to optical backlighting.

It is also to be noted that a persistent phosphor screen may be introduced into the system between the mirror 13 and the television camera 21 so that the system has the additional advantages of storing energy. Even when viewed by the naked eye under such conditions, the image has persistence. It can, therefore, be scanned for transmission with a scan time greatly in excess of the acoustic pulse duration. This results in a reduction of the bandwidth necessary for the image transmission.

It will be realized by those skilled in the art that the placement of the optical flats 14 and the optical flat reflecting surface 16 and the spacing therebetween are extremely critical. The system shown in FIGS. 2 thru 4 provides for controlling the spacing between these two optical flats and for adjustment of the necessary parallelism therebetween. As shown in FIG. 2, there are provided three spacers or pedestals 26, 27 and 28, of piezoelectric material, each having an electrode at each end thereof. This can be seen in greater detail in FIG. 4 wherein the spacer 27 has a pair of electrodes 31 and 32 mounted at opposite ends thereof and a pair of electrical leads 33 and 34 are connected to the electrodes.

As shown in FIG. 2, a voltage may be impressed between the leads 33 and 34 by means of a battery 36 and voltage divider network or potentiometer 37. The voltage impressed upon the crystal 27 causes the crystal to expand or contract in length in accordance with piezoelectric principles. By adjusting the voltages across each of the spacers 26, 27 and 28, the lengths of each spacer can be controlled. By checking the output of the system under no signal (no acoustic energy) conditions the voltages on each of the crystals 26, 27 and 28 may be varied by the use of the potentiometers 37 until no optical signal is produced at the half-reflecting mirror 13. Thus by suitable adjustment of the lengths of the three spaces the optical flats can be aligned for the required optical interference position. There will be realized that by using three spaces spaced around the circular optical flat as shown in FIG. 3, optimum spacing may be easily obtained, and adjustments necessary to compensate for changes in dimensions due to temperature, etc. may be easily made.

Thus there has been described an acoustical-to-optical image converter which is based upon optical interference and is relatively simple and inexpensive in comparison with any other acoustical-to-optical conversion system known at the present time. It is to be pointed out that the system as described is subject to modification as will be obvious to those skilled in the art and that the embodiment shown is merely illustrative of the present invention. For example, various types of optical methods of viewing the output of the system could be utilized without departing from the present invention. In controlling the spacing between the optical flats magnetostrictive principles may be utilized, thermal expansion principles may be utilized, or the entire system may be kept closely temperature controlled.

Obviously many other modifications and variations of the present invention are possible in the light of the above teachings. It is, therefore, to be understood that within the scope of the appended claims the invention may be practiced otherwise than as specifically described.

What is claimed is:

1. A system for viewing objects in nontransparent media comprising:
   (a) a source of acoustical energy for radiating said acoustical energy toward said object, whereby a portion of said acoustical energy is reflected by said object;
   (b) a vibratory element for receiving said reflected portion of said acoustic element and producing local surface perturbations in accordance therewith;
   (c) an optically polished light reflecting surface on said vibratory element;
   (d) means for directing a collimated monochromatic light beam upon said optically polished light reflecting surface;
   (e) an optical flat placed within the path of said collimated light beam and parallel to said light reflecting surface;
   (f) means for spacing said optical flat from said light reflecting surface a sufficient distance to cause optical interference between the light beam passing through said optical flat and the light reflected by said reflecting surface when no acoustic energy is being received by said vibratory element;
   (g) said means for spacing comprising a plurality of selectively expansible spacing members interposed between said optical flat and said light reflecting surface;
   (h) means for selectively expanding and contracting said spacing members;
   (i) means for viewing any light reflected by said polished surface and transmitted through said optical flat.

2. A system for viewing objects in nontransparent media as defined in claim 1 wherein:
   (a) said plurality of selectively expansible spacing members are made of piezoelectric material; and
   (b) said means for selectively expanding and contracting said spacing members including means for selectively impressing an electrical potential across each of said spacing members whereby said spacing members are expanded or contracted.

3. A system for viewing objects in nontransparent media as defined in claim 2 wherein:
   (a) said vibratory element for receiving said reflected portion of said acoustical signal and producing local surface pertubations in accordance therewith comprises a metallic disc.

4. A system for deriving an optical image varying in accordance with an acoustical signal comprising:
   (a) a vibratory element for receiving said acoustical signal and producing local surface perturbations in accordance therewith;
   (b) an optically polished light reflecting surface on said vibratory element;
   (c) means for directing a collimated beam of monochromatic light upon said optically polished light reflecting surface;
   (d) means for deriving an optical image of said collimated light beam as reflected by said reflecting surface, said last named means including;
   (e) an optical flat placed within the path of said collimated light beam and parallel to said light reflecting surface; and
   (f) means for spacing said optical flat from said light reflecting surface a sufficient distance to cause optical interference between the collimated light beam passing through said optical flat and the light reflected by said reflecting surface;

(g) said means for spacing comprising a plurality of selectively expansible spacing members interposed between said optical flat and said light reflecting surface; and (h) means for selectively expanding and contracting said spacing members.

5. A system for deriving an optical image varying in accordance with an acoustical signal as defined in claim 4 wherein:

(a) said plurality of selectively expansible spacing members are made of piezoelectric material; and (b) said means for selectively expanding and contracting said spacing members including means for selectively impressing an electrical potential across each of said spacing members whereby said spacing members are expanded or contracted.

6. A system for deriving an optical image varying in accordance with an acoustical signal as defined in claim 5 wherein:

(a) said vibratory element for receiving said acoustical signal and producing local perturbations in accordance therewith comprises a solid disc.

7. A system for deriving an optical image varying in accordance with an acoustical signal as defined in claim 4 wherein:

(a) said vibratory element for receiving said acoustical signal and vibrating in accordance therewith comprises a solid disc.

References Cited by the Examiner

UNITED STATES PATENTS

| | | | |
|---|---|---|---|
| 1,792,766 | 2/31 | Schroter | 88—14 |
| 2,031,884 | 2/36 | Gray | 343—17 |
| 2,534,846 | 12/50 | Ambrose et al. | 88—14 |
| 2,830,489 | 4/58 | Mitchell et al. | 88—14 |
| 3,040,583 | 6/62 | Post | 88—14 |
| 3,045,535 | 7/62 | Jacquinot et al. | 88—14 |
| 3,050,725 | 8/62 | Kuecken | 88—14 |

FOREIGN PATENTS

| | | |
|---|---|---|
| 444,248 | 5/12 | France. |
| 876,475 | 5/53 | Germany. |

CHESTER L. JUSTUS, *Primary Examiner.*